(12) United States Patent
Zhou et al.

(10) Patent No.: US 10,198,410 B2
(45) Date of Patent: Feb. 5, 2019

(54) METHOD, DEVICE AND MOBILE TERMINAL FOR RESTORING PAGE

(71) Applicant: TENCENT TECHNOLOGY (SHENZHEN) COMPANY LIMITED, Shenzhen (CN)

(72) Inventors: Daxin Zhou, Shenzhen (CN); Ping Kai, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 441 days.

(21) Appl. No.: 14/623,640

(22) Filed: Feb. 17, 2015

(65) Prior Publication Data
US 2015/0161089 A1 Jun. 11, 2015

Related U.S. Application Data

(63) Continuation of application No. PCT/CN2013/081853, filed on Aug. 20, 2013.

(30) Foreign Application Priority Data

Aug. 22, 2012 (CN) .......................... 2012 1 0299245

(51) Int. Cl.
- *G06F 17/00* (2006.01)
- *G06F 17/22* (2006.01)
- *G06F 11/07* (2006.01)

(52) U.S. Cl.
CPC ...... *G06F 17/2288* (2013.01); *G06F 11/0709* (2013.01); *G06F 11/0793* (2013.01)

(58) Field of Classification Search
CPC .............. G06F 17/243; G06F 17/2288; G06F 11/0709; G06F 11/0793; G06F 11/1438; G06F 9/4418; G06F 1/24; G06F 17/30902
(Continued)

(56) References Cited

U.S. PATENT DOCUMENTS

| | | | |
|---|---|---|---|
| 8,775,923 B1 * | 7/2014 | Kroeger | G06F 17/30902 715/200 |
| 2002/0129042 A1 * | 9/2002 | Bradshaw | G06F 8/71 |

(Continued)

FOREIGN PATENT DOCUMENTS

| | | |
|---|---|---|
| CN | 101067812 A | 11/2007 |
| CN | 102236587 A | 11/2011 |
| JP | 2010079382 A | 4/2010 |

OTHER PUBLICATIONS

SAS, "Usage Note 12392: Where the autosave backup files for the Enhanced Editor are stored dependson the SAS Software release and the specifiec Windows operationg system", support.sas.com/kb/12/392.html, Jun. 30, 2009, pp. 1-2.*

(Continued)

*Primary Examiner* — Scott T Baderman
*Assistant Examiner* — Jason T Edwards
(74) *Attorney, Agent, or Firm* — Morgan, Lewis & Bockius LLP

(57) ABSTRACT

A page restoring method includes when starting, detecting whether a predetermined file is empty. The predetermined file is configured to store a Uniform/Universal Resource Locator (URL) accessed before a browser exits abnormally. When detecting that the predetermined file is not empty, take a page corresponding to the URL in the predetermined file as a displaying page.

12 Claims, 4 Drawing Sheets

(58) Field of Classification Search
USPC .......................................................... 715/229
See application file for complete search history.

(56) References Cited

U.S. PATENT DOCUMENTS

| | | | | |
|---|---|---|---|---|
| 2006/0224674 | A1* | 10/2006 | Buchheit ............. | G06F 11/1446 709/206 |
| 2007/0101186 | A1* | 5/2007 | Chen ................... | G06F 11/1456 714/6.11 |
| 2007/0162779 | A1* | 7/2007 | Downer ................... | G06F 1/24 713/340 |
| 2008/0104500 | A1* | 5/2008 | Chalemin ............. | G06F 17/243 715/224 |
| 2010/0153344 | A1 | 6/2010 | Chen et al. | |
| 2011/0258486 | A1* | 10/2011 | Bhogal ............... | G06F 11/1438 714/15 |

OTHER PUBLICATIONS

International Search Report for Application No. PCT/CN2013/081853 dated Dec. 5, 2013.
Chinese Office Action for Application No. 201210299245X dated Jun. 1, 2017, and an English concise explanation of relevance thereof.
International Preliminary Report for Application No. PCT/CN2013/081853 dated Mar. 5, 2013.

* cited by examiner

METHOD, DEVICE AND MOBILE TERMINAL FOR RESTORING PAGE

CROSS-REFERENCE TO RELATED APPLICATIONS

This application is a continuation of International Application No. PCT/CN2013/081853 filed on Aug. 20, 2013. This application claims the benefit and priority of Chinese Application No. 201210299245.X, filed Aug. 22, 2012. The entire disclosures of each of the above applications are incorporated herein by reference.

FIELD

The present disclosure relates to a method, device and mobile terminal for restoring a page.

BACKGROUND

This section provides background information related to the present disclosure which is not necessarily prior art.

An area for displaying contents in a browser may be referred to as a displaying page of the browser. Generally speaking, an existing browser may support simultaneous displaying of multiple displayed pages. At this time, one displayed page may be taken as the current displayed page, and the other displayed pages may be taken as candidate displayed pages, which may also be referred to as a multi-tab page. The current displayed page and the candidate displayed page may be switched to accompany a user's operation.

For a browser running in a mobile terminal, such as a smartphone or a panel computer, since memory space of a mobile terminal may be limited, low memory may easily occur during the process of running the browser, e.g., when a mobile terminal simultaneously runs several applications, each of which occupies a larger memory, or simultaneously browses multiple online video pages. In this case, the browser may easily exit abnormally. To solve the foregoing problem, the existing page restoring method may be as follows. First, a browser may receive a restart signal. Second, after restarting, the browser may open a default browser page, which may be a browser home page set by a user in the browser.

By employing the existing page restoring method, a restored page is a default browser page. Under the circumstances that a user is browsing an interested webpage, when the browser exits abnormally, it is necessary to re-locate and access the webpage. However, when browsing a webpage, a user generally accesses the webpage by clicking on a hyperlink. If the browser exits abnormally, the user may not learn the Uniform/Universal Resource Locator (URL) of the accessed webpage. Thus, it may be very difficult to re-locate and access the webpage. In other words, a user's browsing information may be lost by the existing page restoring method.

SUMMARY

This section provides a general summary of the disclosure, and is not a comprehensive disclosure of its full scope or all of its features.

To solve the problem of losing a user's browsing information by the existing page restoring method, various embodiments provide a method, device and mobile terminal for restoring a page. The technical solutions are as follows.

A method for restoring a page, including:
detecting whether a predetermined file is empty when starting, wherein the predetermined file is configured to store a Uniform/Universal Resource Locator (URL) accessed before a browser exits abnormally; and
when detecting that the predetermined file is not empty, taking a page corresponding to the URL in the predetermined file as a displaying page.

A page restoring device, including a memory, and one or more processors in communication with the memory, wherein the memory stores one or more instructions to be executed by the one or more processors, and the one or more instructions including:
a start detecting instruction, which indicates to detect whether a predetermined file is empty when starting, wherein the predetermined file is configured to store a URL accessed before a browser exits abnormally; and
a history restoring instruction, which indicates to take a page corresponding to the URL stored in the predetermined file as a displaying page, when detecting that the predetermined page is not empty, based on the start detecting instruction.

A mobile terminal, which includes a page restoring device, in which the page restoring device includes a memory and one or more processors in communication with the memory, wherein the memory stores one or more instructions to be executed by the one or more processors, and the one or more instructions include:
a start detecting instruction, which indicates to detect whether a predetermined file is empty when starting, wherein the predetermined file is configured to store a Uniform/Universal Resource Locator (URL) accessed before a browser exits abnormally; and
a history restoring instruction, which indicates to take a page corresponding to the URL stored in the predetermined file as a displaying page, when detecting that the predetermined page is not empty, based on the start detecting instruction.

In view of above, it can be seen that, by employing the technical solution of the present disclosure, detect whether a predetermined file is empty when starting, in which the predetermined file is configured to store a URL accessed, before the browser exits abnormally. When detecting that the predetermined file is not empty, take a page corresponding to the URL in the predetermined file as a displaying page. Subsequently, the problem of losing a user's browsing information in the existing page restoring method may be solved. Thus, even if a browser exits abnormally, the effects of restoring a displaying page, which is accessed by a user before the browser exits abnormally, may be implemented when restarting.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used throughout the present disclosure, the term "includes" means includes but not limited to, the term "including" means including but not limited to. The term "based on" means based at least in part on. In addition, the terms "a" and "an" are intended to denote at least one of a particular element.

Figure 1:
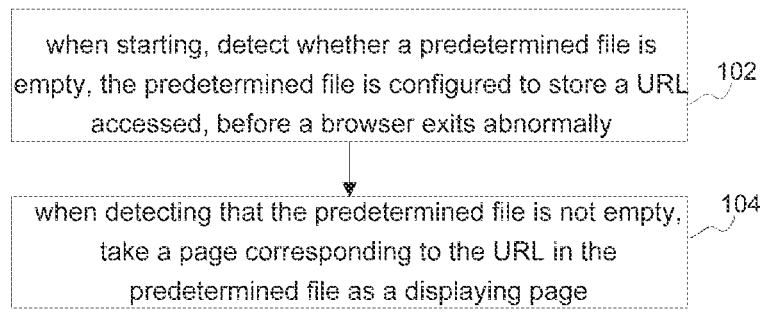
FIG. 1 is a flowchart illustrating a method for restoring a page, in accordance with various embodiments of the present disclosure.

FIG. 1 is a flowchart illustrating a method for restoring a page, in accordance with various embodiments of the present disclosure. The page restoring method may be applied to a terminal running a browser application, which may include the following blocks.

Block 102: detect whether a predetermined file is empty when starting, in which the predetermined file is configured to store a URL accessed, before a browser exits abnormally. When starting, the browser may detect whether the predetermined file is empty. The predetermined file is configured to store a URL accessed, before the browser exits abnormally.

Block 104: when detecting that the predetermined file is not empty, take a page corresponding to the URL stored in the predetermined file as a displaying page. When detecting that the predetermined file is not empty, the browser may take the page corresponding to the URL stored in the predetermined file as the displaying page to be displayed. At this time, the browser may display at least one page, which is accessed by a user before the browser exits abnormally.

It should be noted that, when the predetermined file only stores one URL, the displaying page is a currently displayed page. When the predetermined file stores two or more URLs, the displaying page may consist of a currently displayed page and a candidate displaying page. For example, take a page corresponding to the first URL in the predetermined file as the currently displayed page. Take pages corresponding to the second and subsequent URLs in the predetermined file as the candidate displaying pages. For another example, take a page corresponding to the last URL in the predetermined file as the currently displayed page. Take pages corresponding to the other URLs in the predetermined file as the candidate displaying pages.

The currently displayed page and candidate displaying page may be switched, to accompany a user's operation.

Figure 2:
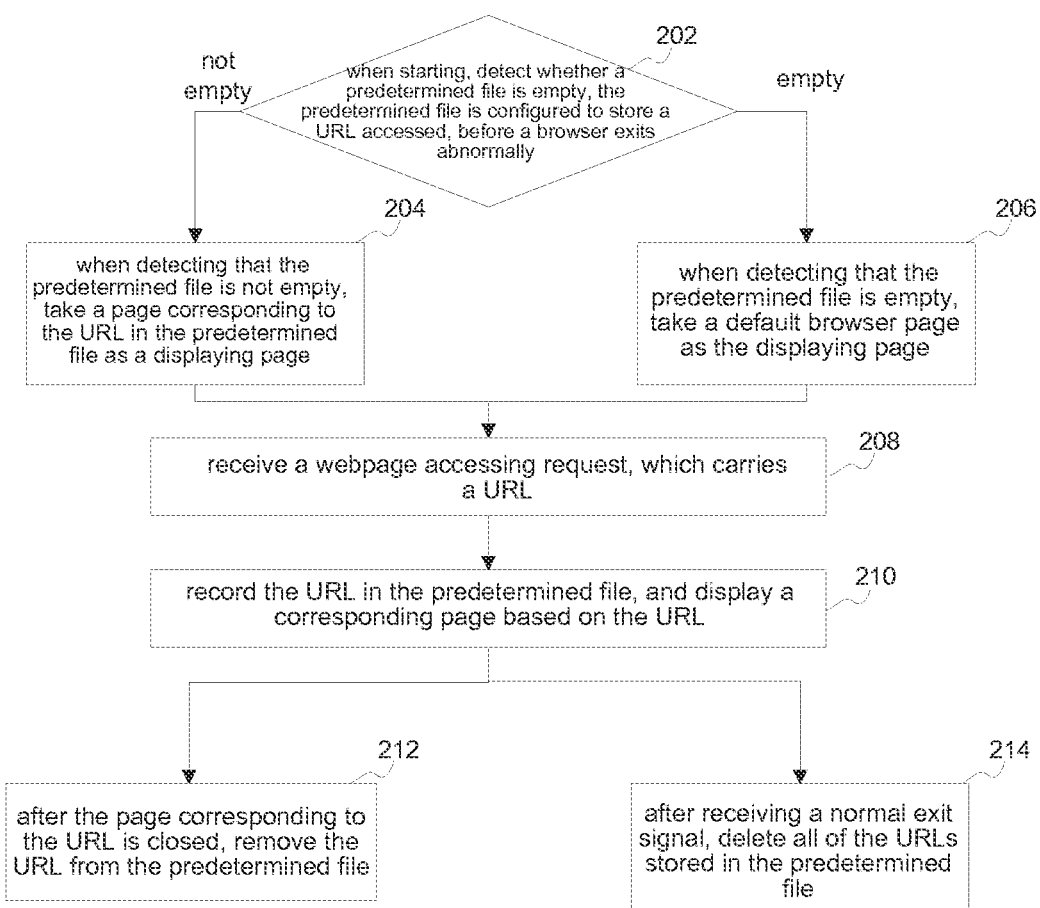
FIG. 2 is a flowchart illustrating a method for restoring a page, in accordance with a various embodiments of the present disclosure.

FIG. 2 is a flowchart illustrating a method for restoring a page, in accordance with various embodiments of the present disclosure. The page restoring method may be applied to a terminal running a browser application, which may include the following blocks.

Block 202: when starting, detect whether a predetermined file is empty. The predetermined file is configured to store a URL accessed, before a browser exits abnormally. When detecting that the predetermined file is not empty, proceed with block 204. When detecting that the predetermined file is empty, proceed with block 206. When starting, the browser may detect whether the predetermined file is empty. The predetermined file is configured to store a URL accessed, before the browser exits abnormally.

Block 204: when detecting that the predetermined file is not empty, take a page corresponding to the URL stored in the predetermined file as a displaying page. When the browser detects that the predetermined file is not empty, it means that the browser exited abnormally the last time. The browser may take the page corresponding to the URL stored in the predetermined file as the displaying page to be displayed. At this time, the browser may display at least one page, which was accessed by a user before the browser exits abnormally.

To improve the user experience, when detecting that the predetermined file is not empty, the browser may first transmit a prompt message to the user to request that the user indicates whether to restore a page browsed previously. After receiving a feedback message from the user, which indicates that the user agrees to restore the page browsed previously, the browser may take the page corresponding to the URL stored in the predetermined file as the displaying page. After receiving the feedback message from the user, which indicates that the user does not agree to restore the page browsed previously, the browser may still take a default browser page as the displaying page. For example, when detecting that the predetermined file is not empty, the browser may display a prompt box "whether to restore the page browsed previously", and provide two buttons, "agree" and "cancel". When the user clicks on the "agree" button, the browser may take the page corresponding to the URL in the predetermined file as the displaying page. When the user clicks on the "cancel" button, the browser may take the default browser page as the displaying page. The default browser page may be a browser home page, which is set by the user in the browser.

To confirm that the restored displaying page is the same as the page which was displayed before the browser exited abnormally, the predetermined file may store page state information of a URL. The page state information is configured to identify whether a page corresponding to the URL was the currently displayed page before the browser exits abnormally. At this time, based on the page state information of each URL, the browser may take a page, which was the currently displayed page before the browser exits abnormally, as the currently displayed page after restoring, and take a page, which was a candidate displaying page before the browser exits abnormally, still as the candidate displaying page after restoring. For example, the predetermined file includes two URLs. The first URL is www.12345.com/12345.html. The second URL is www.abcdef.com/12345.html. Meanwhile, the predetermined file may store the page state information, which indicates that the page corresponding to the first URL was the currently displayed page, before the browser exits abnormally. Subsequently, after restarting, the browser may create two new Tab pages. A first Tab page is configured to display the page corresponding to www.12345.com/12345.html, which is taken as the currently displayed page. The other Tab page is configured to display the page corresponding to www.abcdef.com/12345.html, which is taken as the candidate displaying page superimposed on the currently displayed page. At this time, the browser may display at least one webpage, which was accessed by a user before the browser exits abnormally. The displaying effects after the browser restarts are the same as that before the browser exits abnormally.

Block 206: when detecting that the predetermined file is empty, take the default browser page as the displaying page. When the browser detects that the predetermined file is empty, it means that the browser exited normally last time. The browser may take the default browser page as the displaying page to be displayed. The default browser page may be the browser home page, which is set by the user in the browser.

Block 208: receive a webpage accessing request, which carries a URL. After starting, the browser may receive a webpage accessing request from a user, which carries a URL that the user would like to access. For example, the browser may receive a URL input by the user into an address bar or receive a click-on signal from the user, which is for a hyperlink on the currently displayed page. The hyperlink is a URL.

Block 210: record the URL in the predetermined file and display the corresponding page based on the URL. Subsequently, the browser may display the corresponding page based on the URL. Meanwhile, the browser may record the URL of the webpage accessing request into the predetermined file. The process of displaying the corresponding page by the browser based on the URL may include the following. The browser may initiate a webpage data obtaining request to a webpage server or file system, based on the URL. The browser may then receive webpage data fed back by the webpage server or file system. Finally, after performing parsing, rendering, and type setting on the webpage data received, the browser may create a new page or display within the currently displayed page.

As a supplementary description, in the block, the browser may also simultaneously record the page state information for the URL. The page state information is configured to identify whether a page corresponding to the URL is the currently displayed page during current browsing process. After recording, when the state of the page corresponding to the URL changes between the currently displayed page and the candidate displaying page, the browser may simultaneously update the page state information corresponding to the URL in the predetermined file.

Still as supplementary descriptions, there may be multiple specific modes of the page state information, which are not limited in the present disclosure. For example, set a corresponding state bit for the page state information for each URL. When the state bit is 1, it means that the page corresponding to the URL is the currently displayed page. When the state bit is 0, it means that the page corresponding to the URL is the candidate displaying page. For another example, a special processing may be executed when storing the URL corresponding to the currently displayed page. No special processing will be executed when storing a URL corresponding to a candidate displaying page. The foregoing special processing may refer to adding an identifier for page state information, or employing a specific description format, and so on.

Block 212: after the page corresponding to the URL is closed, remove the URL from the predetermined file. During the running process of the browser, when the page corresponding to the URL is closed in block 210, the browser may remove the URL from the predetermined file. The page may be closed after a user actively clicks to close or after the browser exits normally. In block 210, when the browser simultaneously records the page state information of the URL, after the page corresponding to the URL is closed, simultaneously remove the URL and corresponding page state information from the predetermined file.

Block 214: after receiving a normal exit signal, delete all of the URLs stored in the predetermined file. During the running process of the browser, after receiving the normal exit signal, the browser may delete all of the URLs stored in the predetermined file before exiting normally. In block 210, when the browser simultaneously records the page state information of the URL, after receiving the normal exit signal, the browser may delete all of the URLs and corresponding page state information in the predetermined file.

It should be noted that blocks 212 and 214 may exist simultaneously or individually. It is obvious that neither the execution of block 212 nor that of block 214 may be triggered when the browser exits abnormally. Subsequently, when the browser starts again, the predetermined file is not empty and execution of block 204 may be triggered. When the browser exits normally, the execution of at least one of block 212 and block 214 may be triggered. Subsequently, when the browser starts again, the predetermined file is empty and execution of block 206 may be triggered.

Figure 3:
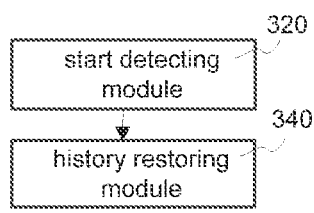
FIG. 3 is a diagram illustrating structure of a page restoring device, in accordance with various embodiments of the present disclosure.

FIG. 3 is a diagram illustrating structure of a page restoring device, in accordance with various embodiments of the present disclosure. The page restoring device may become a part of a mobile terminal running a browser application, which includes a start detecting module 320 and a history restoring module 340. The start detecting module 320 is configured to detect whether a predetermined file is empty when starting, in which the predetermined file is configured to store a URL accessed before a browser exits abnormally. The history restoring module 340 is configured to take a page corresponding to the URL in the predetermined file as a displaying page, when the start detecting module 320 detects that the predetermined file is not empty.

In view of above, in accordance with the technical solutions of foregoing first and third embodiments, the problem of losing a user's browsing information in the existing page restoring method may be solved, by detecting whether the predetermined file is empty when starting, in which the predetermined file is configured to store the URL accessed, before the browser exits abnormally. When detecting that the predetermined file is not empty, take the page corresponding to the URL in the predetermined file as the currently displayed page. Thus, even if the browser exits abnormally, the effects of restoring the displaying pages accessed by the user before the browser exits abnormally may be achieved when restarting.

Figure 4:
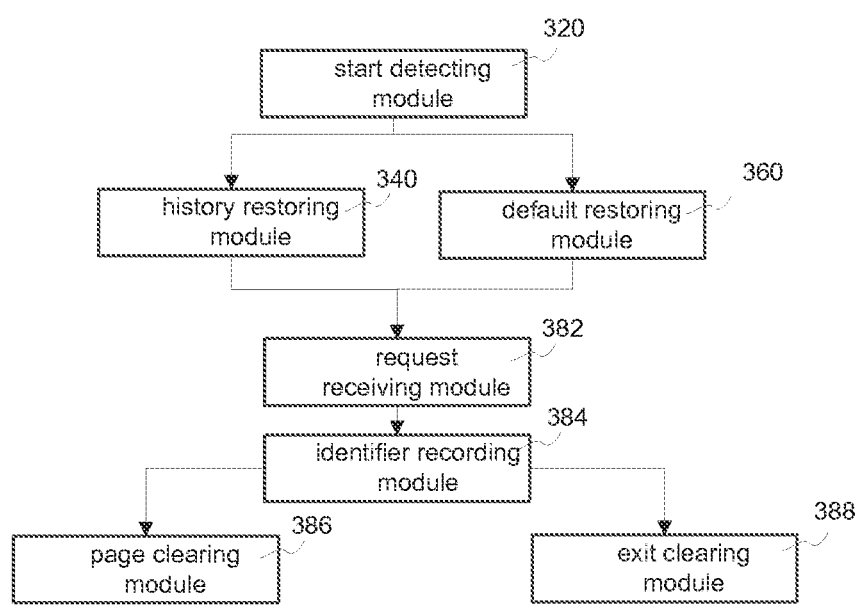
FIG. 4 is a diagram illustrating structure of a page restoring device, in accordance with various embodiments of the present disclosure.

FIG. 4 is a diagram illustrating structure of a page restoring device, in accordance with various embodiments of the present disclosure. The page restoring device may become a part of a mobile terminal running a browser application. Compared with the third embodiment, the page restoring device not only includes the start detecting module 320 and the history restoring module 340, but also includes a default restoring module 360, a request receiving module 382, an identifier recording module 384, and at least one of a page clearing module 386 and an exit clearing module 388.

The start detecting module 320 is configured to detect whether a predetermined file is empty when starting, in which the predetermined file is configured to store a URL accessed before a browser exits abnormally. The history restoring module 340 is configured to take a page corresponding to the URL in the predetermined file as a displaying page when the start detecting module 320 detects that the predetermined file is not empty. The default restoring module 360 is configured to take a default browser page as the displaying page when the start detecting module 320 detects that the predetermined file is empty. The request receiving module 382 is configured to receive a webpage accessing request, which carries a URL. The identifier recording module 384 is configured to record the URL received by the request receiving module 382 in the predetermined file and display the corresponding page based on the URL. The page clearing module 386 is configured to remove the URL from the predetermined file after the page corresponding to the URL is closed. The exit clearing module 388 is configured to delete all of the URLs in the predetermined file, which are stored by the identifier recording module 384, after receiving a normal exit signal.

Figure 5:
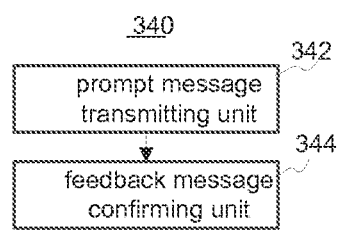
FIG. 5 is a diagram illustrating structure of a history restoring module, in accordance with various embodiments of the present disclosure.

The history restoring module 340 may further include a prompt message transmitting unit 342 and a feedback message confirming unit 344, as shown in FIG. 5. The prompt message transmitting unit 342 is configured to transmit a prompt message to a user which requests that the user to indicate whether to restore the page browsed previously. The feedback message confirming unit 344 is configured to take the page corresponding to the URL in the predetermined file as the displaying page, after receiving by the prompt message transmitting unit 342 the feedback message from the user, which indicates that the user agrees to restore the page browsed previously. On the other hand, in various embodiments, the predetermined file is further configured to store page state information of the URL. The page state information is configured to identify whether the page corresponding to the URL is the currently displayed page before the browser exits abnormally.

Figure 6:
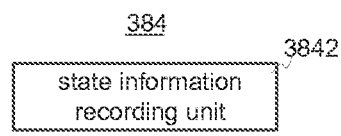
FIG. 6 is a diagram illustrating structure of an identifier recording module, in accordance with various embodiments of the present disclosure.

At this time, based on the page state information of each URL, the history restoring module 340 is configured to restore the page corresponding to the URL, which is the currently displayed page before the browser exits abnormally, still as the currently displayed page and restore the page corresponding to the URL, which was not the currently displayed page before the browser exits abnormally, still as the candidate displaying page. Correspondingly, the identifier recording module 384 still includes a state information recording unit 3842, as shown in FIG. 6. The state information recording unit 3842 is configured to record the page state information of the URL. The page state information is configured to identify whether the page corresponding to the URL is the currently displayed page, before the browser exits abnormally.

The page clearing module 386 is configured to remove the URL and corresponding page state information from the predetermined file after the page corresponding to the URL is closed. The exit clearing module 388 is configured to delete all of the URLs and corresponding page state information in the predetermined file after receiving a normal exit signal.

Various embodiments of the present disclosure also provide a machine readable storage medium, which may store instructions enabling a machine to execute the method for restoring a page as mentioned above. Specifically speaking, a system or device with such storage medium may be provided. The storage medium may store software program codes, which may implement functions of any foregoing example. A computer (or Central Processing Unit (CPU), or Micro Processing Unit (MPU)) of the system or device may read and execute the program codes stored in the storage medium.

In this case, the program codes read from the storage medium may implement functions of any foregoing example. Thus, the program codes and storage medium may form a part of the present disclosure.

Figure 7:
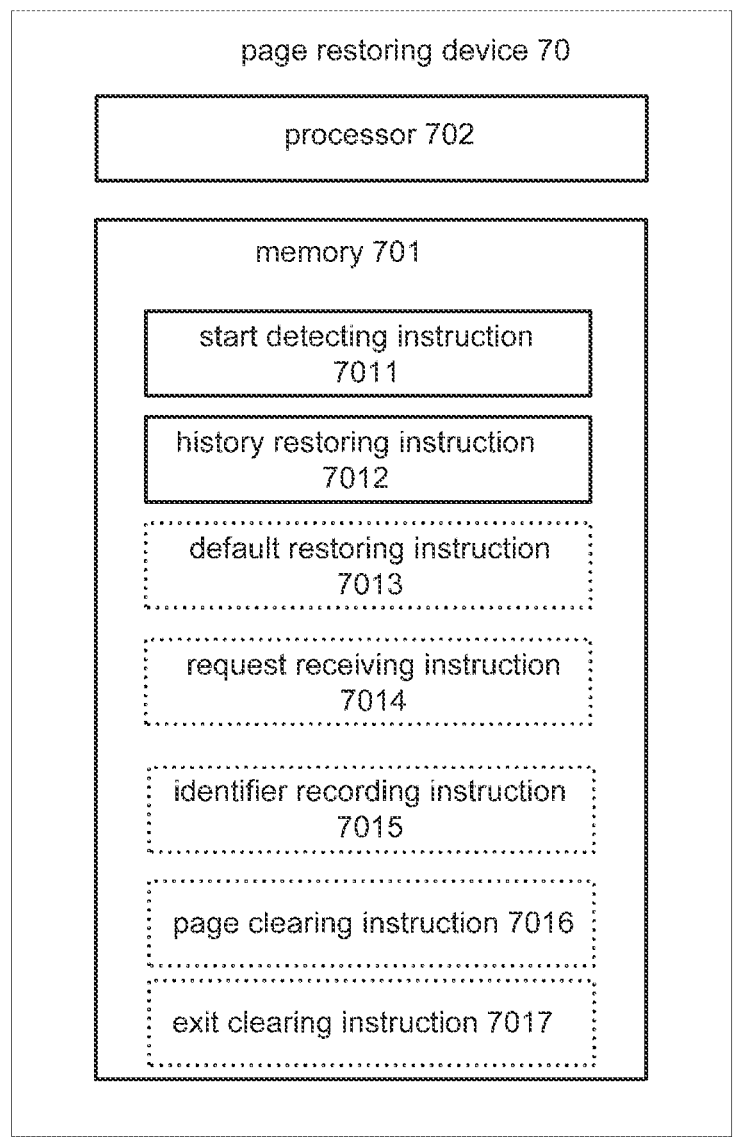
FIG. 7 is a diagram illustrating structure of a page restoring device, in accordance with various embodiments of the present disclosure.

For example, FIG. 7 is a diagram illustrating structure of a page restoring device, in accordance with various embodiments of the present disclosure. The page restoring device may become a part of a mobile terminal running a browser application. The page restoring device 70 may include a memory 701, and one or more processors in communication with the memory 701. To facilitate description, only one processor 702 is shown in FIG. 7. Memory 701 may store one or more instructions to be executed by the one or more processors, such as processor 702 shown in FIG. 7, and the one or more instructions may include a start detecting instruction 7011 and a history restoring instruction 7012.

The start detecting instruction 7011 indicates whether a predetermined file is empty when starting, in which the predetermined file is configured to store a URL accessed, before a browser exits abnormally. The history restoring instruction 7012 indicates to take a page corresponding to the URL in the predetermined file as a displaying page when detecting that the predetermined file is not empty based on the start detecting instruction 7011. The foregoing one or more instructions may further include a default restoring instruction 7013, a request receiving instruction 7014, an identifier recording instruction 7015, and at least one of a page clearing instruction 7016 and an exit clearing instruction 7017. The default restoring instruction 7013 indicates to take a default browser page as the displaying page when detecting that the predetermined file is empty based on the start detecting instruction 7011. The request receiving instruction 7014 indicates to receive a webpage accessing request, which carries a URL. The identifier recording instruction 7015 indicates to record the URL, which is received based on the request receiving request 7014 in the predetermined file, and display the corresponding page based on the URL. The page clearing instruction 7016 indicates to remove the URL from the predetermined file after the page corresponding to the URL is closed. The exit clearing instruction 7017 indicates to delete all of the URLs, which are stored in the predetermined file based on the identifier recording instruction 7015, after receiving a normal exit signal.

The history restoring instruction 7012 may further include a prompt message transmitting instruction 70121 and a feedback message confirming instruction 70122 (not shown in the figure). The prompt message transmitting instruction 70121 indicates to transmit a prompt message to a user, to request the user to indicate whether to restore the page browsed previously. The feedback message confirming instruction 70122 indicates to take the page corresponding to the URL in the predetermined file as the displaying page after receiving the feedback message based on the prompt message transmitting instruction 70121, which indicates that the user agrees to restore the page browsed previously.

On the other hand, the predetermined file is further configured to store the page state information of the URL.

The page state information of the URL is configured to identify whether the page corresponding to the URL was the currently displayed page, before the browser exited abnormally.

Based on the page state information of each URL, the history restoring instruction 7012 indicates to restore the page corresponding to the URL, which was the currently displayed page before the browser exits abnormally, still as the currently displayed page after restarting, and indicates to restore the page corresponding to the URL, which was not the currently displayed page before the browser exited abnormally, still as the candidate displaying page after restarting.

Correspondingly, the identifier recording instruction 7015 may further include a state information recording instruction 70151 (not shown in the figure). The state information recording instruction 70151 indicates to record the page state information of the URL. The page state information is configured to identify whether the page corresponding to the URL was the currently displayed page, before the browser exits abnormally.

The page clearing instruction 7016 indicates to remove the URL and corresponding page state information from the predetermined file after the page corresponding to the URL is closed. The exit clearing instruction 7017 indicates to remove all of the URLs and corresponding page state information from the predetermined file after receiving a normal exit signal.

In view of above, in accordance with the technical solutions of foregoing second, fourth and fifth various embodiments, by detecting whether the predetermined file is empty when starting, in which the predetermined file is configured to store a URL accessed before the browser exits abnormally, when detecting the predetermined file is not empty, take the page corresponding to the URL in the predetermined file as the currently displayed page, the problem of losing a user's browsing information in the existing page restoring method may be solved. Thus, even if the browser exits abnormally, the effects of displaying the pages, which were accessed by the user before the browser exited abnormally, may be achieved when restarting. In addition, by storing the URL of the webpage accessing request in the predetermined file, and deleting relevant records in the predetermined file, when the page is closed or the browser exits normally, the effects of recording the URL accessed before the browser exits abnormally in the predetermined file may be achieved. On the other hand, by storing page state information in the predetermined file, and restoring the displayed page taking into account the page state information, the effects of restoring a displaying page, which is the same as that accessed by a user before the browser exits abnormally, may be achieved when restarting after the browser exits abnormally.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

What is claimed is:

1. A computer-implemented method for restoring a page, comprising:

detecting whether a predetermined file is empty when starting a browser, wherein the predetermined file is configured to store a plurality of Uniform/Universal Resource Locators (URLs) accessed before the browser exits abnormally, the plurality of URLs corresponding to a plurality of pages opened respectively by a plurality of tabs of the browser, and wherein the predetermined file is further configured to store page state information of each URL, and the page state information of a respective page is configured to identify whether the respective page, which corresponds to a respective URL from the plurality of URLs stored in the predetermined file, was a currently displayed page opened by an active tab before the browser exits abnormally;

when detecting that the predetermined file is not empty, taking the plurality of pages corresponding to the plurality of URLs in the predetermined file as displaying pages respectively page, which comprises:

based on the page state information of each URL, restoring a first page corresponding to a first URL on a first active tab, which was the currently displayed page before the browser exits abnormally, still as the currently displayed page, wherein the page state information of the first URL includes a first state bit indicating that the first page was the currently displayed page, and in response to including the first state bit in the page state information of the first URL, the page state information of the first URL further includes a unique page identifier or a predefined description format; and restoring a second page corresponding to a second URL on a second tab distinct from the first tab, which was not the currently displayed page before the browser exits abnormally, still as a candidate displaying page, wherein the page state information of the second URL includes a second state bit indicating that the second page was the candidate displaying page, and in response to including the second state bit in the page state information of the second URL, the page state information of the second URL does not include any page identifier or predefined description format.

2. The computer-implemented method according to claim 1, further comprising:

when detecting that the predetermined file is empty, taking a default browser page as the displaying page.

3. The computer-implemented method according to claim 1, wherein before taking the page corresponding to the at least one URL in the predetermined file as the displaying page, when detecting that the predetermined file is not empty, the method further comprises:

transmitting a prompt message to a user, to request the user to indicate whether the user agrees to restore the page browsed previously;

after receiving a feedback message from the user, which indicates that the user agrees to restore the page browsed previously, taking the page corresponding to the at least one URL in the predetermined file as the displaying page.

4. The computer-implemented method according to claim 1, further comprising:
receiving a webpage accessing request, which carries a URL;
displaying a corresponding page based on the URL, recording the URL and corresponding page state information the predetermined file;
after the page corresponding to the URL is closed, removing the URL and corresponding page state information from the predetermined file; and/or, after receiving a normal exit signal, deleting the URL and corresponding page state information stored in the predetermined file.

5. A page restoring device, comprising a memory and a processor in communication with the memory, wherein the memory stores instructions that when executed by the processor cause the processor to:
detect whether a predetermined file is empty when starting a browser, wherein the predetermined file is configured to store a plurality of Uniform/Universal Resource Locators (URLs) accessed before the browser exits abnormally, the plurality of URLs corresponding to a plurality of pages opened respectively by a plurality of tabs of the browser, and wherein the predetermined file is further configured to store page state information of each URL, and the page state information of a respective page is configured to identify whether the respective page, which corresponds to a respective URL from the plurality of URLs stored in the predetermined file, was a currently displayed page opened by an active tab before the browser exits abnormally;
when detecting that the predetermined file is not empty, take the plurality of pages corresponding to the plurality of URLs in the predetermined file as displaying pages respectively, which comprises:
based on the page state information of each URL,
restore a first page corresponding to a first URL on a first active tab, which was the currently displayed page before the browser exits abnormally, still as the currently displayed page, wherein the page state information of the first URL includes a first state bit indicating that the first page was the currently displayed page, and in response to having the first state bit in the page state information of the first URL, the page state information of the first URL further includes a unique page identifier or a predefined description format; and
restore a second page corresponding to a second URL on a second tab distinct from the first tab, which was not the currently displayed page before the browser exits abnormally, still as a candidate displaying page, wherein the page state information of the second URL includes a second state bit indicating that the second page was the candidate displaying page, and in response to including the second state bit in the page state information of the second URL, the page state information of the second URL does not include any page identifier or predefined description format.

6. The device according to claim 5, wherein the instructions further cause the processor to:
take a default browser page as a displaying page, when detecting that the predetermined file is empty.

7. The device according to claim 5, wherein the instructions further cause the processor to:
transmit a prompt message to a user, to request the user to indicate whether the user agrees to restore a page browsed previously; and
take a page corresponding to a URL in the predetermined file as a displaying page, after receiving a feedback message from the user, which indicates that the user agrees to restore the page browsed previously.

8. The device according to claim 5, wherein the instructions further cause the processor to
receive a webpage accessing request, which carries a URL;
display the page corresponding to the URL, record the URL and corresponding page state information in the predetermined file;
remove the URL and corresponding page state information from the predetermined file, after the page corresponding to the URL is closed; and
delete the URL and corresponding page state information stored in the predetermined file, after receiving a normal exit signal.

9. A mobile terminal, which comprises a page restoring device, wherein the page restoring device comprises a memory and processor in communication with the memory, wherein the memory stores instructions that when executed by the processor cause the processor to:
detect whether a predetermined file is empty when starting a browser, wherein the predetermined file is configured to store a plurality of Uniform/Universal Resource Locators (URLs) accessed before the browser exits abnormally, the plurality of URLs corresponding to a plurality of pages opened respectively by a plurality of tabs of the browser, and wherein the predetermined file is further configured to store page state information of each URL, and the page state information of a respective page is configured to identify whether the respective page, which corresponds to a respective URL from the plurality of URLs stored in the predetermined file, was a currently displayed page opened by an active tab before the browser exits abnormally; and
when detecting that the predetermined file is not empty, take the plurality of pages corresponding to the plurality of URLs in the predetermined file as displaying pages respectively, which comprises:
based on the page state information of each URL,
restore a first page corresponding to a first URL on a first active tab, which was the currently displayed page before the browser exits abnormally, still as the currently displayed page, wherein the page state information of the first URL includes a first state bit indicating that the first page was the currently displayed page, and in response to having the first state bit in the page state information of the first URL, the page state information of the first URL further includes a unique page identifier or a predefined description format; and
restore a second page corresponding to a second URL on a second tab distinct from the first tab, which was not the currently displayed page before the browser exits abnormally, still as a candidate displaying page, wherein the page state information of the second URL includes a second state bit indicating that the second page was the candidate displaying page, and in response to including the second state bit in the page state information of the second URL, the page state information of the second URL does not include any page identifier or predefined description format.

10. The mobile terminal according to claim 9, wherein the instructions further cause the processor to: take a default browser page as a displaying page, when detecting that the predetermined file is empty.

11. The mobile terminal according to claim 9, wherein the instructions further cause the processor to:
transmit a prompt message to a user, to request the user to indicate whether the user agrees to restore a page browsed previously; and
take the page corresponding to the URL in the predetermined file as a displaying page, after receiving a feedback message from the user, which indicates that the user agrees to restore the page browsed previously.

12. The mobile terminal according to claim 9, wherein the instructions further cause the processor to:
receive a webpage accessing request, which carries a URL;
display the page corresponding to the URL, record the URL, and corresponding page state information in the predetermined file;
remove the URL and corresponding page state information from the predetermined file, after the page corresponding to the URL is closed; and
delete the URL and corresponding page state information stored in the predetermined file, after receiving a normal exit signal.

* * * * *